Aug. 2, 1927.
A. S. HOWELL
1,637,378
MOTION PICTURE MECHANISM
Filed Nov. 21, 1925
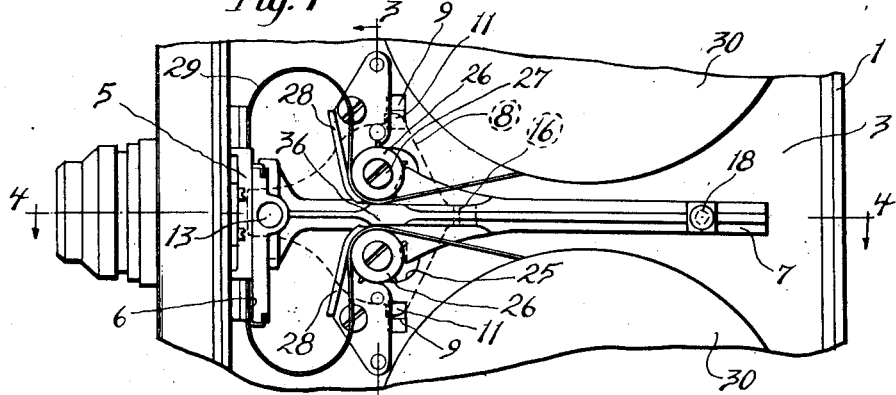
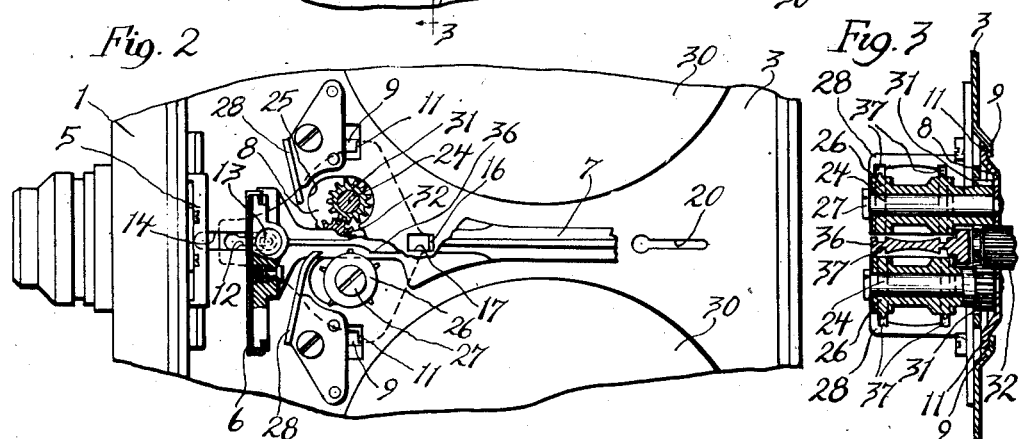
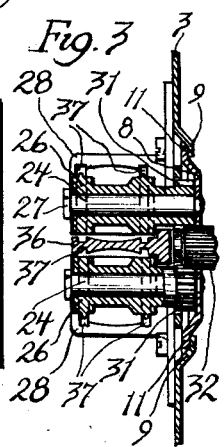
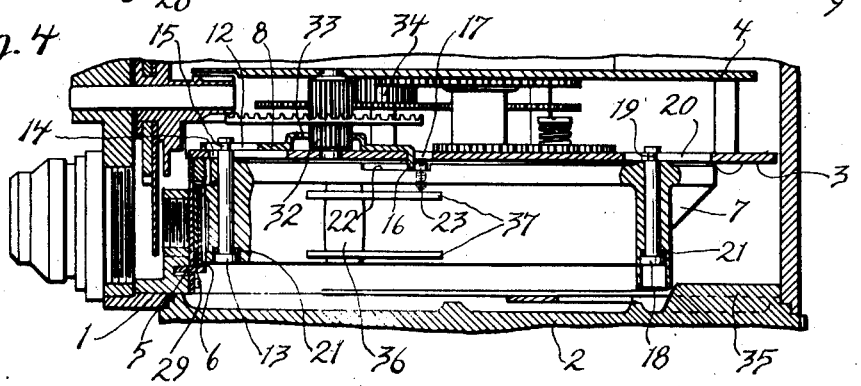
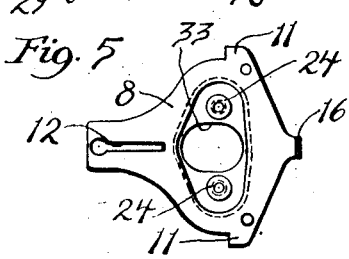
Inventor
Albert S. Howell
By Miehle & Miehle, Attys Patented Aug. 2, 1927.

1,637,378

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

MOTION-PICTURE MECHANISM.

Application filed November 21, 1925. Serial No. 70,449.

My invention has particular relation to motion picture cameras although not limited to this use alone.

The features of my invention relate to the film engaging and retaining devices of the feeding mechanism of motion picture mechanism with a view toward the provision of a simple and effective mechanism which is convenient in lacing and unlacing the film and which is well adapted for a motion picture camera of the general character described and claimed in my co-pending application Serial No. 662,478, filed September 13, 1923, for improvement in motion picture camera and the like.

With these features in view my invention consists in certain features of novelty in the construction, combination, and arrangement of parts by which the said features and certain other features are effected, all as fully described with reference to the accompanying drawing and more particularly pointed out in the claims.

In the said drawing—

Figure 1 is a partial side elevation of a motion picture camera, embodying my invention, with the cover thereof removed.

Figure 2 is a similar view showing the parts in different positions and with certain parts broken away.

Figure 3 is a partial section on the line 3—3 of Fig. 1.

Figure 4 is a partial section on the line 4—4 of Fig. 1.

Figure 5 is a face view of the bracket plate hereinafter described.

Like characters of reference indicate like parts in the several views.

Referring to the drawing 1 designates a camera casing open at one side, which side is closed by a cover 2 removably attached to the casing. See Figs. 1, 2, and 4. Secured in the casing and spaced inwardly from the open side thereof is a mechanism frame disposed parallel with said open side and consisting of outer and inner frame plates 3 and 4 secured in spaced parallelism.

Disposed in a vertical transverse plane within the casing and between the outer frame plate 3 and the open side of the casing is an intermittent film feed guide 5, the rear film face guide member 6 of which is mounted on the front end of a carrier member 7 mounted on the outside of the frame plate 3 for forward and rearward movement, in a manner hereinafter described, for forward and rearward movement of the guide member 6 to close and open the feed guide 5. The feed guide 5 is shown closed in Figs. 1 and 4 and is shown open in Fig. 2.

A bracket plate 8 is disposed similarly with the frame plate 3 on the inside thereof and is mounted thereon in the following manner. Vertically spaced lugs 9 are formed from the plate 3 in opposing relation and are offset inwardly in spaced relation with this plate and engage the inside surfaces of extensions 11 of the bracket plate at the upper and lower edges thereof whereby to confine the bracket plate between them and the inside face of the plate 3 for forward and rearward movement. The bracket plate 8 extends forwardly from the extensions 11 with a central reduced portion which is provided with a forwardly and rearwardly extending slot 12 therethrough. A headed stud 13 extends through a counterbored transverse bore through the carrier member 7 adjacent its front end and through a forwardly and rearwardly extending slot 14 through the plate 3, and has a circumferential groove 15 adjacent the end of its shank which is engaged in the slot 12 in the bracket plate 8. Thus are the forward ends of the carrier member 7 and the bracket plate 8 carried by the plate 3 for independent forward and rearward movement. The bracket plate 8 is provided at its rear end with a central lug 16 which is turned normal to the plane of the bracket plate and extends outwardly through a forwardly and rearwardly extending slot 17 in the plate 3. Thus is the bracket plate 8 mounted on the plate 3 for forward and rearward movement.

The forward end of the carrier member 7 is mounted on the plate 3 for forward and rearward movement by means of the stud 13 engaged as hereinbefore described. The carrier member 7 extends rearwardly on the outside of the plate 3, from the rear film face guide member 6, with its main portion which is flat and disposed in a horizontal plane centrally of the bracket plate 8, and the rear end of the carrier member is mounted on the plate 3 for forward and rearward movement by means of a headed stud 18 extending through a counterbored transverse bore through the carrier member adjacent its rear end and having a circumferential groove 19 adjacent the end of its shank which is engaged in a forwardly and rearwardly extending slot 20 through the plate 3. Spring washers 21 under the heads of the studs 13 and 18 serve to hold the related parts securely.

The lug 16 of the bracket plate 8 extends outwardly of the outer face of the plate 3 and lies between the sides of a relatively wide vertical slot 22 on the inner side of the main portion of the carrier member 7. See Fig. 4. The lug 16 is engaged by the forward side of the slot 22 to move the bracket plate 8 rearwardly with rearward movement of the carrier member, and this lug is engaged with the head of a screw 23, screwthreaded into the carrier member at the rear of the lug, to move the bracket plate 8 forwardly with forward movement of the carrier member. There is considerable space between the forward side of the slot 22 and the head of the screw 23, and the lug 16 disposed therebetween forms therewith a lost motion connection between the carrier member 7 and the bracket plate 8 whereby the bracket plate is moved relatively short distances forwardly and rearwardly compared with the corresponding movements of the carrier member for purposes hereinafter described.

A pair of transversely disposed vertically spaced parallel studs 24 are secured to an intermediate inwardly offset portion of the bracket plate 8 and project outwardly therefrom at the rear of the feed guide 5 and respectively above and below the carrier member 7 and normal to the plate 3 through respective relatively large apertures 25 therein. A pair of bored constant feed film sprockets 26 are journaled on respective studs 24 and extend outwardly from the bracket plate 8 through respective apertures 25 and have the sprocket portions thereof on the outside of the plate 3 in film feeding alinement with the feed guide 5, headed screws 27 screwthreaded into the outer ends of respective studs 24 retaining the sprockets against outward movement on these studs. Thus the sprockets 26 are carried by the bracket plate 8 for forward and rearward movement therewith.

A pair of guides 28 are mounted on the outside of the plate 3 in front of respective sprockets 26 and are adapted for retaining portions of a perforated film 29, leading from opposite ends of the feed guide 5, engaged with respective sprockets, when the sprockets are in their forward positions, with the film portions extending from the ends of the feed guide in rearwardly curved compensating loops and then in front of respective adjacent sprockets and rearwardly therefrom between the sprockets to respective film spools 30 mounted within the casing 1 in film feeding alinement with the sprockets and disposed respectively above and below the carrier member 7. See Fig. 1.

When the carrier member 7 is in its forward position the rear film face guide member 6 is disposed forwardly in film retaining relation with the remainder of the feed guide 5 and the sprockets 26 are disposed forwardly in film retaining relation with the guides 28 as shown in Fig. 1. When the carrier member 7 is in its rearward position the guide member 6 is disposed rearwardly of the remainder of the guide 5 and out of film retaining relation therewith for inserting the film in or removing the same from the feed guide and the sprockets 26 are disposed rearwardly of the guides 8 and out of film retaining relation therewith for lacing the film on or removing the same from the sprockets as shown in Fig. 2.

Spur gears 31 are formed on the inner ends of the sprockets 26, and disposed between these gears on the inside of the plate 3 is a third spur gear member 32 which meshes with the gears 31 for driving the sprockets in the same direction. The gear member 32 is disposed transversely between the plates 3 and 4 and is journaled in each and passes through a large aperture 33 in the bracket plate 8.

The forward position of the sprockets 26, as shown in Fig. 1, is the functioning position thereof and the gear member 32 is disposed to fully mesh with the gears 31 for driving the same in this position of the sprockets, this driving arrangement permitting the forward and rearward movement of the sprockets as aforesaid. The gear 31 is included in a driving gear train 34 carried by the frame plates 3 and 4 between the same for driving the various devices of the camera.

By reason of the lost motion connection between the carrier member 7 and the bracket plate 8 the rear film face guide member 6 may be moved rearwardly far enough from the remainder of the feed guide 5 for conveniently removing the film therefrom and inserting the same therein without causing an excessive movement of the sprockets rearwardly to an inconvenient position or the disengagement of the gears 31 from the gear, the lost motion connection being such that the sprockets are positioned as shown in Fig. 2 with the gears 31 engaged with the gear 32 when the carrier member is at the rear end of its movement.

A lug 35 on the cover 2 is disposed at the rear of the carrier member 7 to secure the carrier member in its forward position when the cover is closed.

The carrier member 7 extends between the sprockets 26 for guiding the film between and rearwardly of the sprockets, and is preferably provided with a thickened portion 36 which, when the carrier member is in its forward position, is adapted to retain the film on the sprockets, and which, when the carrier member is in its rearward position, by reason of the greater movement of the carrier member with respect to the rearward movement of the sprockets, as hereinbefore described, is out of film retaining relation with the sprockets for lacing the film on the sprockets or unlacing the same therefrom.

The rear faces of the guide 28 and the upper and lower surfaces of the carrier member 7 are grooved as designated at 37 to clear the teeth of the sprockets 26.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:—

1. In a motion picture mechanism the combination of a revoluble film sprocket, a guide for retaining film thereon, means carrying the sprocket for movement into and out of film retaining relation with the guide, a spur gear fast on the sprocket, a second spur gear meshing with said first gear for driving the sprocket and disposed with its axis in a plane passing through the axis of said first mentioned gear and normal to said movement of the sprocket and maintaining engagement with said first mentioned gear in said movement of the sprocket.

2. In a motion picture mechanism the combination of a frame plate, a bracket disposed on the inside of said frame plate and carried thereby for movement parallel thereto, a revoluble film sprocket carried by said bracket for movement therewith and disposed on an axis normal to the plate, and extending outwardly therefrom through an opening in said frame plate and having the sprocket portion thereof on the outside of said frame plate, a film guide mounted on said frame plate and disposed for movement of said sprocket into and out of film retaining relation therewith, and means carried with said frame plate and engaged with the inner end of said sprocket for driving the same and adapted to permit said movement of said sprocket with said bracket.

3. In a motion picture mechanism the combination of a frame plate, a bracket plate disposed similarly with said frame plate on the inside thereof and mounted thereon for movement parallel with the plane of the same, a stud secured on said bracket plate and disposed normal to said frame plate and projecting outwardly therefrom through a relatively large aperture in said frame plate, a film sprocket journaled on said stud and extending outwardly from said bracket plate through said aperture and having the sprocket portion thereof on the outside of said frame plate, a film guide mounted on said frame plate and disposed for movement of said sprocket with said bracket plate into and out of film retaining relation therewith, a spur gear formed on the inner end of said sprocket, and a second spur gear on the inside of said frame plate and journaled thereon on an axis in a plane passing through the sprocket axis and normal to said movement of the sprocket and meshing with said first mentioned gear for driving the same and maintaining engagement therewith in said movement of said sprocket.

4. In a motion picture mechanism the combination of a pair of parallel revoluble film sprockets, guide means at one side of said sprockets for retaining film thereon, means carrying said sprockets for movement into and out of film retaining relation with said guide means, a pair of spur gears fast on respective sprockets, and a third spur gear between said pair of gears and meshing therewith for driving the same.

5. In a motion picture mechanism the combination of a frame plate, a bracket plate disposed similarly with said frame plate at the inside thereof and mounted thereon for movement parallel with the plane of the same, a pair of parallel studs secured on said bracket plate and disposed normal to said frame plate and in a plane normal to said movement of said bracket plate and projecting outwardly therefrom through relatively large openings in the frame plate, a pair of film sprockets journaled on respective studs and extending outwardly from said bracket plate through said openings and having the sprocket portions thereof on the outside of said frame plate, guide means mounted on said frame plate at one side of said sprockets for movement of said sprockets into and out of film retaining relation therewith, a pair of spur gears formed on the inner ends of said sprockets, and a third spur gear on the inside of said frame plate and journaled thereon and disposed between said pair of gears and meshing therewith for driving the same and maintaining engagement therewith in said movement of said sprockets.

6. In a motion picture mechanism the combination with an intermittent film feed guide, of a pair of constant feed film sprockets disposed to the rear of said guide in film feeding alinement therewith and spaced longitudinally thereof, guide means in front of said sprockets for retaining a film thereon, a carrier member carrying the rear film face guide portion of said feed guide and extending rearwardly therefrom between and rearwardly of said sprockets for guiding the film and movable forwardly and rearwardly to close and open said feed guide, means whereby said sprockets are carried for movement forwardly and rearwardly into and out of film retaining relation with said second mentioned guide means respectively with feed guide closing and opening movements of said carrier member, and mean for driving said sprockets in the same direction and adapted to permit said movement thereof.

7. In a motion picture mechanism the combination with an intermittent film feed guide, of a pair of constant feed film sprockets disposed to the rear of said guide in film feeding alinement therewith and spaced longitudinally thereof, guide means in front of said sprockets for retaining a film thereon, a carrier member carrying the rear film face guide portion of said feed guide and extending rearwardly therefrom between and rearwardly of said sprockets for guiding the film and movable forwardly and rearwardly to close and open said feed guide, a bracket carrying said sprockets and movable forwardly and rearwardly for movement of the sprockets into and out of film retaining relation with said second mentioned guide means, a lost motion connection between said bracket and said carrier member for movement of said sprockets into and out of film retaining relation with said second mentioned guide means respectively with feed guide closing and opening movement of said carrier member, a pair of spur gears fast on respective of said sprockets, and a third spur gear between said pair of gears and meshing therewith for driving the same and maintaining engagement therewith in said movement of said sprockets.

In witness whereof I hereunto affix my signature this 16th day of November, 1925.

ALBERT S. HOWELL.